(12) United States Patent
Schaffer et al.

(10) Patent No.: US 7,194,363 B2
(45) Date of Patent: Mar. 20, 2007

(54) ULTRASONIC FLOWMETER

(75) Inventors: Joe Schaffer, Greenwood, IN (US); Dean Sylvia, The Woodlands, TX (US)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/740,922

(22) Filed: Dec. 22, 2003

(65) Prior Publication Data

US 2005/0137812 A1    Jun. 23, 2005

(51) Int. Cl.
*G01R 21/00* (2006.01)
(52) U.S. Cl. .................... 702/60; 340/870.39
(58) Field of Classification Search ............ 702/39, 702/45, 48, 57, 60, 62, 64, 65, 80, 98, 99, 702/100, 103, 104, 116, 138, 182, 861.06, 702/861.08, 861.23, 533, 870.38
See application file for complete search history.

(56) References Cited

U.S. PATENT DOCUMENTS

| | | | | |
|---|---|---|---|---|
| 4,242,665 A | * | 12/1980 | Mate | ............... 340/870.38 |
| 5,650,571 A | * | 7/1997 | Freud et al. | ............ 73/861.06 |
| 6,452,493 B1 | * | 9/2002 | Ma et al. | .................... 340/533 |
| 6,473,710 B1 | * | 10/2002 | Eryurek | ..................... 702/133 |
| 6,640,308 B1 | * | 10/2003 | Keyghobad et al. | ........ 713/300 |
| 6,845,330 B2 | * | 1/2005 | Okuda et al. | ................. 702/38 |
| 6,928,866 B2 | * | 8/2005 | Michalski et al. | ........ 73/290 R |
| 2003/0045962 A1 | * | 3/2003 | Eryurek et al. | ............ 700/128 |
| 2003/0126932 A1 | * | 7/2003 | Brockhaus | ............. 73/861.356 |
| 2004/0107779 A1 | * | 6/2004 | Kishimoto et al. | ...... 73/861.29 |
| 2004/0120109 A1 | * | 6/2004 | Kennedy et al. | ............ 361/683 |

* cited by examiner

*Primary Examiner*—Marc S. Hoff
*Assistant Examiner*—Mohamed Charioui
(74) *Attorney, Agent, or Firm*—Bacon & Thomas, PLLC

(57) ABSTRACT

A low power ultrasonic flowmeter to be powered by a two wire power supply loop is described, comprising: an ultrasonic flow sensor, a signal processing unit for determining a measurement result based on measurements performed by the ultrasonic flow sensor, an input/output unit to be connected to the two wire loop, for controlling a current of the power supplied to represent the measurement result, for receiving power from the power supply loop, and a power management system, for an energy efficient distribution of the power supplied to the flowmeter via the input/output unit, comprising storage means for storing energy during times of low power consumption and resupplying the stored energy during times of high power consumption.

6 Claims, 2 Drawing Sheets

ULTRASONIC FLOWMETER

BACKGROUND OF THE INVENTION

The present invention relates to an ultrasonic flowmeter.

Ultrasonic flowmeters are commonly used devices for measuring a flow of a liquid through a pipe. In various branches of industry, for example in the chemical industry or in the pharmaceutical industry, the measurement data obtained by flowmeters is used to control complex industrial processes.

Ultrasonic flowmeters use acoustic waves or vibrations of a frequency of more than 20 kHz. Depending on the design, they use either wetted or non-wetted transducers on the pipe perimeter to couple ultrasonic energy with the fluid in the pipe.

SUMMARY OF THE INVENTION

Some ultrasonic flowmeters operate on the Doppler effect, whereby the transmitted frequency is altered linearly by being reflected from particles and bubbles in the fluid. The frequency shift is linearly proportional to the rate of flow of materials in the pipe and is used to develop a signal proportional to the flow rate.

In addition, there are flowmeters on the market, which measure the difference in transit time between signals, for example pulses or beams, transmitted in a single path along and against the flow. Two transducers are used, one upstream of the other. Both act as transmitter and receiver for the ultrasonic signal. The flow velocity is directly proportional to the difference of the upstream and downstream transit times. A product of a cross-sectional area of the pipe and the flow velocity provides a measure of the volumetric flow.

Today ultrasonic flowmeters are available, which are either battery powered portable systems or line powered units connected to a power supply line, generally an alternating current power line. The later comprises two terminals for connection to a power source and two terminals for carrying a loop signal proportional to a measurement result. These so-called four wire flowmeters require the use of four conductors between the flowmeter and the related control loops and the power supply. Because the instrument is directly connected to the power supply, power consumption is not a critical factor. Where flowmeters are remotely located though, such a requirement is undesirable due to the significant costs of cabling.

To avoid this problem, instrument manufacturers developed devices known as two-wire or loop powered measurement devices. A two-wire measurement device comprises only two connectors for connecting to a remote power source. The measurement result is transmitted via the same two wires, which are also used for supplying power to the device. The measurement device controls the loop current drawn from the power supply to be proportional to the measurement result. An industry standard has been developed according to which the measurement devices are powered by a 24 volt DC power source and the loop current varies between four and twenty milliamps representing the measurement result. Whenever a low level signal of only four milliamps is transmitted, very little power is available to the measurement device.

In U.S. Pat. No. 5,207,101 a two-wire ultrasonic level measurement device is described comprising an ultrasonic level sensor, a signal processing unit for determining a measurement result based on measurements performed by the ultrasonic level sensor, and an input/output unit to be connected to a two wire loop,
for controlling a current of the power supplied to represent the measurement result and
for receiving power from the power supply loop.

The ultrasonic level sensor comprises a single ultrasonic transducer for sending an ultrasonic signal towards a surface of a medium and for receiving its reflection. The level of the medium is determined based on a time of flight of the ultrasonic signal for traveling towards the surface and its reflection to return to the measurement device. In order to minimize power consumption, the level measurement device is configured to normally operate in a sleep mode by disabling an amplifier circuit of the ultrasonic level sensor when it is not necessary for operation and by awakening it when it is necessary.

Ultrasonic level measurement devices can operate using only a single power consuming ultrasonic transducer. Ultrasonic flowmeters usually comprise two ultrasonic transducers. Accordingly, power consumption of ultrasonic flowmeters is generally higher than power consumption of ultrasonic level measurement devices.

It is an object of the invention to provide a low power ultrasonic flowmeter to be powered by a two-wire power supply loop.

To this end, the invention comprises a low power ultrasonic flowmeter to be powered by a two wire power supply loop comprising:

an ultrasonic flow sensor, a signal processing unit for determining a measurement result based on measurements performed by the ultrasonic flow sensor, an input/output unit to be connected to the two wire loop,
for controlling a current of the power supplied to represent the measurement result,
for receiving power from the power supply loop, and a power management system,
for an energy efficient distribution of the power supplied to the flowmeter via the input/output unit,
comprising storage means for storing energy during times of low power consumption and resupplying the stored energy during times of high power consumption.

According to a refinement of the invention, the storage means comprise a first storage means for storing energy feedback from the ultrasonic flow sensor.

According to a further refinement of the invention, the storage means comprise a second storage means for storing incoming energy received via the input/output unit.

According to a further refinement of the invention, the input/output unit comprises a circuit for sending and receiving data via the two-wire power supply loop.

According to a preferred embodiment, the two-wire power supply loop complies to an industry standard, in particular Foundation Fieldbus, Profibus, Modbus, HART or Ethernet.

The invention further comprises a method of operation of a low power ultrasonic flowmeter according to the invention wherein a measurement cycle comprises the consecutive steps of initiation of at least one ultrasonic signal, reception of a corresponding ultrasonic measurement signal, processing of the measurement signal to provide a measurement result, and providing an output according to the measurement result.

According to a refinement of this method, power for initiation of ultrasonic signals is provided by the power management system utilizing instantaneous incoming power and power stored in the storage means.

According to a further refinement of this method, during the steps of reception of a corresponding ultrasonic measurement signal, processing of the measurement signal to provide a measurement result and providing an output according to the measurement result surplus energy is stored in the storage means.

According to a further refinement of this method, energy-consuming components of the flowmeter are only active when they perform. They are in a low power standby or inactive mode during all other times of every measurement cycle.

The low power supply needed to operate the device allows for the ultrasonic flowmeter to be designed as an intrinsically safe system. Intrinsically safe devices can be used in hasardous areas. A hasardous area is for example an area in which flammable gases are present or could be present.

The invention and further advantages are explained in more detail using the figures of the drawing, in which two exemplary embodiments are shown. The same reference numerals refer to the same elements throughout the figures.

DETAILED DESCRIPTION OF THE DRAWINGS

Figure 1:
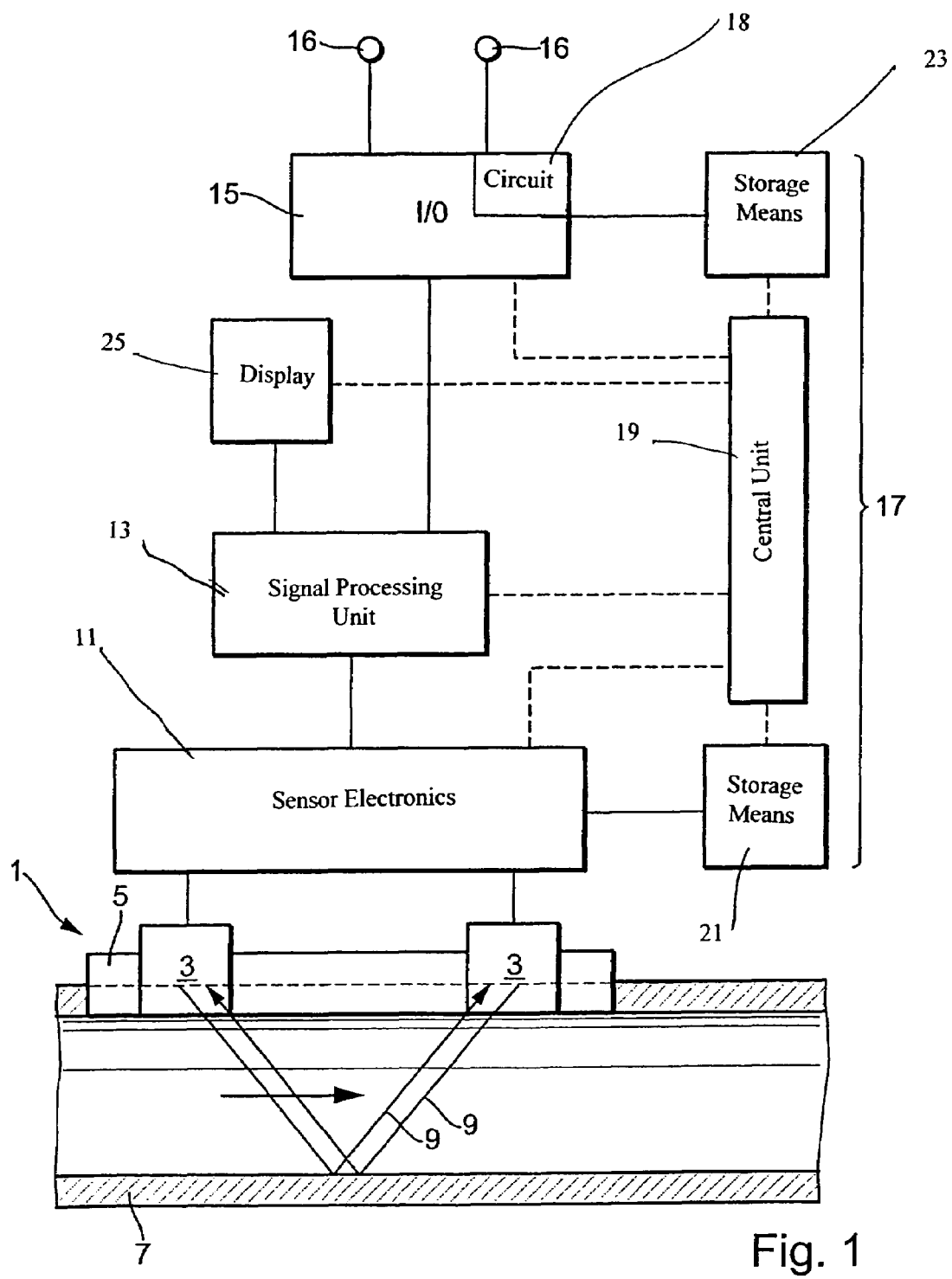
FIG. 1 shows a schematic diagram of an ultrasonic transit time flowmeter according to the invention.

FIG. 1 shows a schematic diagram of a low power ultrasonic transit time flowmeter to be powered by a two-wire power supply loop. It comprises an ultrasonic flow sensor 1. The ultrasonic flow sensor 1 comprises two ultrasonic transducers 3. The transducers 3 are electro-mechanical transformers, for example piezoelectric elements. Emission of ultrasonic signals 9, i.e. ultrasonic pulses or beams, is initiated by a drive circuit and ultrasonic signals 9 received by the transducers 3 are amplified by an amplifier circuit for further processing. The transducers 3 are mounted on a rack 5 on a pipe 7. One ultrasonic transducer 3 is located upstream of the other. A flow rate of a fluid inside the pipe 7 is to be measured.

Both ultrasonic transducers 3 serve as transmitters and as receivers for ultrasonic signals 9. In operation, each ultrasonic transducer 3 transmits an ultrasonic signal 9 into the pipe 7. The signal 9 is reflected by the opposing pipe wall and received by the other ultrasonic transmitter 3.

The ultrasonic flowmeter comprises a sensor electronic 11 connected to the ultrasonic transducers 3. The sensor electronic 11 transforms the amplified signals of the ultrasonic transducers 3 into measurement signals. The measurement signals are supplied to a signal processing unit 13 for determining a measurement result based on measurements performed by the ultrasonic flow sensor 1. To this extent it determines the difference in transit time between ultrasonic signals 9 transmitted in a single path along and against the flow. The flow velocity is directly proportional to the difference of the upstream and downstream transit times. A product of a cross-sectional area of the pipe and the flow velocity provides a measure of the volumetric flow.

Further, the ultrasonic flowmeter comprises an input/output unit 15. The input/output unit 15 is equipped with two connectors 16 for connection of the ultrasonic flowmeter to a two-wire supply loop, not shown in FIG. 1. The input/output unit 15 is designed for receiving power from the power supply loop.

The input/output unit 15 is connected to the signal processing unit 13. The signal processing unit 13 supplies the measurement result to the input/output unit 15 which in turn controls a current of the power supplied via the two-wire control loop to represent the measurement result. Preferably, the current is varied according to an industry standard, for example between four and twenty milliamps. A minimal flow corresponds for example to a current of four milliamps and a maximal flow to a current of twenty milliamps.

Preferably the input/output unit 15 comprises a circuit 18 for sending and receiving data via the two-wire power supply loop. The circuit 18 allows superimposing a communication signal on the current and reception of a communication signal superimposed on the current. Any analog or digital communication signal capable of carrying power thru the two wires is feasable.

Preferably, the two-wire power supply loop complies to an industry standard, in particular Foundation Field bus, Profibus, Modbus, HART or Ethernet. In operation, the measurement result is transmitted via the two-wire control loop. The measurement result can for example be transmitted to one or more process control unit, for example to a distributed control system (DCS) or to local controllers. In addition, bidirectional communication between the process control unit and the ultrasonic flowmeter is supported according to these industry standards.

The input/output unit 15 can thus send and receive data, for example measurement values, data related to operational performance and data concerning configuration, diagnostics and testing.

The ultrasonic flowmeter comprises a display 25, which is linked to the signal processing unit 13 and the power management system 17.

The power received via the input/output unit 15 is the sole power supply for the entire ultrasonic flowmeter. In order to operate the ultrasonic flowmeter at all times, even when the present power supply is low due to a low current representing the actual measurement result, the ultrasonic flowmeter according to the invention comprises a power management system 17 for an energy efficient distribution of the power supplied to the flowmeter via the input/output unit 15. The power management system 17 comprises a central unit 19 for active distribution of the power and storage means 21, 23. The central unit 19 is connected to the sensor electronics 11, the signal processing unit 13, input/output means 15 and the storage means 21, 23.

The storage means 21, 23 comprise a first storage means 21 for storing energy feedback from the ultrasonic flow sensor 1 and a second storage 23 means for storing incoming energy received via the input/output unit 15.

The power management system 17 is designed for storing energy during times of low power consumption and resupplying the stored energy during times of high power consumption.

During operation, the ultrasonic flowmeter according to the invention performs measurement cycles. Each measurement cycles comprises the consecutive steps of initiation of at least one ultrasonic signal 9, reception of a corresponding ultrasonic measurement signal, processing of the measurement signal to provide a measurement result, and providing an output according to the measurement result.

The power needed for initiation of ultrasonic signals 9 is provided by the power management system 17 utilizing instantaneous incoming power and power stored in the storage means 21 and 23. During transmission, the ultrasonic transducer 3 which is presently sending out an ultrasonic signal 9 is simultaneously provided with power from all three availably sources of power. It is not limited to the instantaneous incoming power, which depending on the present measurement result can be very low, as described above.

Whilst ultrasonic signals 9 are being send, the power management 17 preferably clamps the available incoming power to the amount needed, to generate and send the ultrasonic signals 9 and conserves the remaining energy. When the incoming power is very high, due to a high loop current, surplus energy can thus be saved and stored during emission. When the incoming power is very low, due to a low loop current, no surplus energy can be obtained. Power previously stored in the storage means 21 and 23 is then made available by the power management system 15.

During the steps of reception of a corresponding ultrasonic measurement signal, processing of the measurement signal to provide a measurement result and providing an output according to the measurement result the energy needed by the flowmeter is significantly lower. During these steps, surplus energy is stored in the storage means 21, 23.

Surplus energy of the ultrasonic transducers 3 is directed to the first storage means 21 and stored. Preferably, all energy of the ultrasonic transducers 3 before and after transmission of an ultrasonic signal 9 and before and after reception of the corresponding transducer signal, used for determining the measurement result, any energy of the ultrasonic transducers 3 is directed to the first storage means 21 by the power management system 17. Before and after transmission of an ultrasonic signal 9 and before and after reception of the corresponding transducer signal, used for determining the measurement result, the electro-mechanical transformer, i.e. the piezoelectric element, of the transducer 3, does not immediately stop swinging. During theses intervalls, the electro-mechanical transformer is operating in a generator mode. The energy of motion is withdrawn from the electro-mechanical transformer by the power management system 17 in form of electrical energy and supplied to the first storage means 21. During these intervals, a reflection of the ultrasonic signal 9 sent, is received by the ultrasonic transducers 3 and sets the electro-mechanical transformer into motion. Their energy of motion generates electrical energy which is stored in the first storage means 21 and made available to the power management system 17 to be used for the next required operation.

Any surplus energy, obtained from the two wire control loop via the input/output unit 15, which is not used by the flowmeter during the steps of reception of an ultrasonic measurement signal corresponding to the ultrasonic signal 9, processing of the measurement signal to provide a measurement result and providing an output according to the measurement result, is supplied to the second storage means 23 and stored there.

In order to minimize the overall power consumption of the ultrasonic flowmeter, energy consuming components of the flowmeter are only active when they perform. They are in a low power standby or inactive mode during all other times of every measurement cycle. Energy consuming components are for example drive and amplifier circuits of the ultrasonic transducers 3.

This same concept can be used in a system utilizing multiple pairs of ultrasonic transducers which would allow a flow measurement using a multipath technique. This technique would allow a more accurate flow measurement by using multiple measurements to compensate for changing flow profiles.

The invention is not limited to ultrasonic flowmeters, which measure the difference in transit time between pulses transmitted in a single path along and against the flow. The invention can also be applied to ultrasonic flowmeters using other methods of ultrasonic flow measurement.

Figure 2:
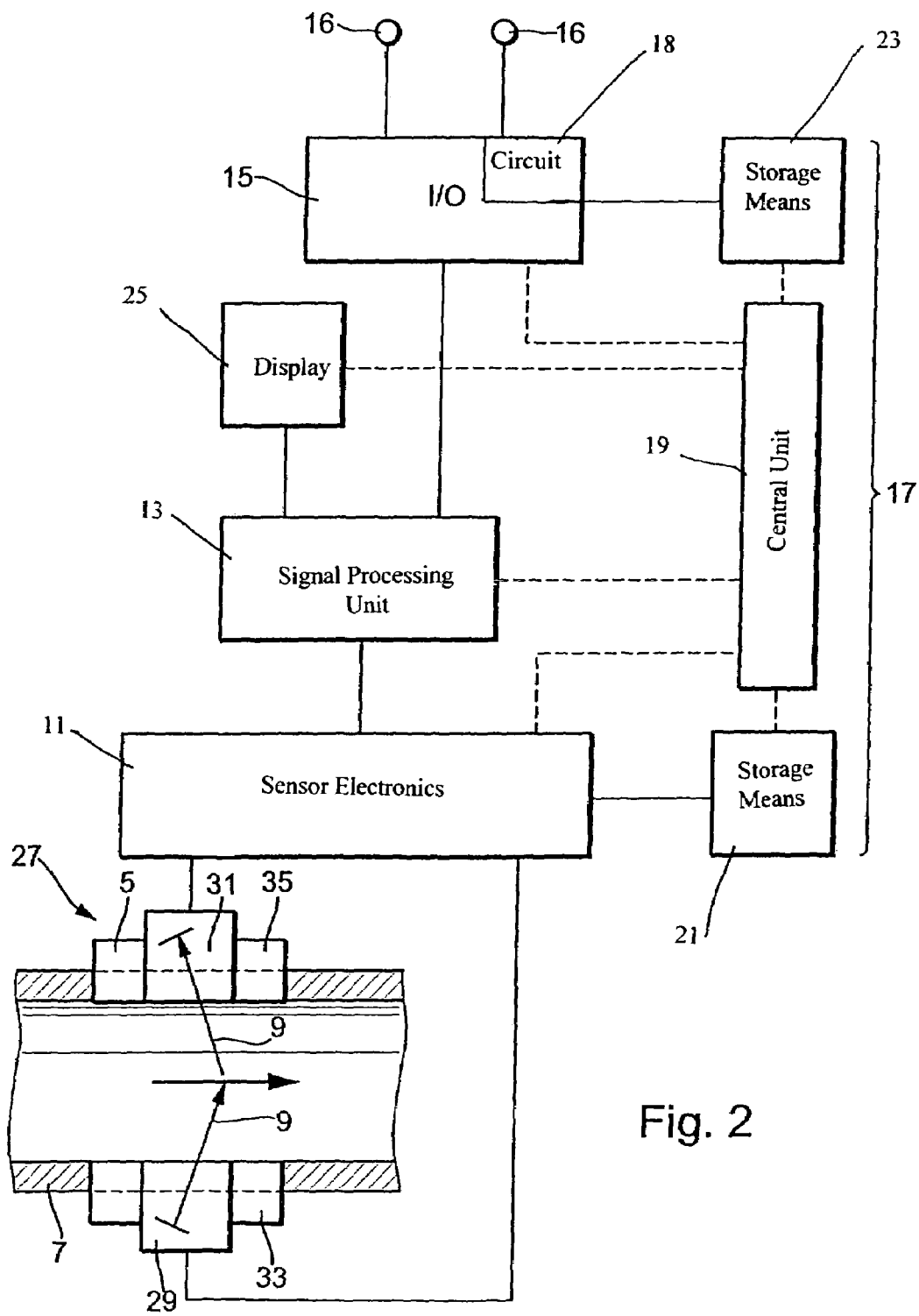
FIG. 2 shows a schematic diagram of an ultrasonic Doppler flowmeter according to the invention.

FIG. 2 shows a schematic diagram of an ultrasonic Doppler flowmeter according to the invention. Because of the similarities between the ultrasonic flowmeters shown in FIG. 1 and FIG. 2 only the differences are described in more detail below.

The embodiment shown in FIG. 2 comprises an ultrasonic flow sensor 27. The ultrasonic flow sensor 27 comprises a first ultrasonic transducer 29 and a second ultrasonic transducer 31. The first and the second ultrasonic transducer 29 and 31 are electro-mechanical transformers, for example piezoelectric elements. The first ultrasonic transducer 29 and the second ultrasonic transducer 31 are mounted on a first and a second rack 33, 35 on opposing wall segments of the pipe 7, such that they are facing towards each other.

The first ultrasonic transducer 29 operates as a transmitter for transmitting ultrasonic signals into the pipe 7. A drive circuit initiates emission of ultrasonic signals 9, i.e. ultrasonic beams or pulses. The frequency of the signal transmitted by the first ultrasonic transducer 29 is altered linearly by being reflected from particles and bubbles in the fluid. The frequency shift is linearly proportional to the rate of flow of materials in the pipe 7. The altered signal is received by the second ultrasonic transducer 31, which operates as a receiver. The received ultrasonic signals are amplified by an amplifier circuit and supplied to the sensor electronic 11 for further processing. The sensor electronic 11 transforms the amplified signals of the second ultrasonic transducer 31 into a measurement signal proportional to the flow rate.

During operation, the Doppler ultrasonic flowmeter according to the invention performs measurement cycles. Each measurement cycle comprises the consecutive steps of initiation of at least one ultrasonic signal 9 via the first ultrasonic transducer 29, reception of a corresponding ultrasonic signal by the second ultrasonic transducer 31, processing of the measurement signal to provide a measurement result, and providing an output according to the measurement result.

The power needed for initiation of ultrasonic signals 9 is provided to the first ultrasonic transducer 29 by the power management system 17 utilizing instantaneous incoming power and power stored in the storage means 21 and 23. During transmission, the first ultrasonic transducer 29 sending out an ultrasonic signal 9 is simultaneously provided with power from all three availably sources of power. It is not limited to the instantaneous incoming power, which depending on the present measurement result can be very low, as described above.

During the steps of reception of a corresponding ultrasonic signal, processing of the measurement signal to provide a measurement result and providing an output according to the measurement result the energy needed by the flowmeter is significantly lower. During these steps, surplus energy is stored in the storage means 21, 23.

Surplus energy of the first and the second ultrasonic transducer 29, 31 is directed to the first storage means 21 and stored. Preferably, all energy of the first ultrasonic transducer 29 before and after transmission of an ultrasonic signal 9 and all energy of the second ultrasonic transducer 31 before and after reception of the corresponding signal, used for determining the measurement result, is directed to the first storage means 21 by the power management system 17. Before and after transmission of an ultrasonic signal 9 the electro-mechanical transformer, i.e. the piezoelectric element, of the first transducer 29, does not immediately stop swinging. This energy of motion is withdrawn from the electro-mechanical transformer by the power management system 17 via the sensor electronic 11 in form of electrical energy and supplied to the first storage means 21. Before and after reception of the signal corresponding to the previously sent ultrasonic signal 9 the electro-mechanical transformer of the second ultrasonic transducer 31, i.e. the piezoelectric element, does not immediately stop swinging. Again, this energy of motion is withdrawn from the electro-mechanical transformer by the power management system 17 in form of electrical energy and supplied to the first storage means 21.

Any surplus energy, obtained from the two wire control loop via the input/output unit 15, which is not used by the flowmeter during the steps of reception of an ultrasonic signal corresponding the transmitted ultrasonic signal 9, processing of the measurement signal to provide a measurement result and providing an output according to the measurement result, is supplied to the second storage means 23 and stored.

In order to minimize the overall power consumption of the Doppler ultrasonic flowmeter, energy consuming components of the flowmeter are only active when they perform. They are in a low power standby or inactive mode during all other times of every measurement cycle. Energy consuming components are for example the drive circuit of the first ultrasonic transducer 29 and the amplifier circuit of the second ultrasonic transducers 31.

Ultrasonic flowmeters according to the invention make optimal use of all power supplied to the flowmeter via the two-wire power supply loop. The power management system 17 including the storage means 21, 23 allows not only to distribute incoming energy efficiently but also to retrieve and store unused energy, which would normally be wasted.

What is claimed is:

1. A low power ultrasonic flowmeter to be powered by a two wire power supply loop comprising:
   an ultrasonic flow sensor;
   a signal processing unit for determining a measurement result based on measurements performed by the ultrasonic flow sensor;
   an input/output unit to be connected to the two wire loop, for controlling a current of the power supplied to represent the measurement result, and for receiving power from the power supply loop; and
   a power management system, for an energy efficient distribution of the power supplied to the flowmeter via the input/output unit, said power management system comprising storage means for storing energy during times of low power consumption and resupplying the stored energy during times of high power consumption, wherein:
   said storage means comprise storage means for storing incoming energy received via said input/output unit, and further storage means for storing energy feedback from said ultrasonic flow sensor.

2. The low power ultrasonic flowmeter according to claim 1, wherein:
   said input/output unit comprises a circuit for sending and receiving data via the two-wire power supply loop.

3. The low power ultrasonic flowmeter according to claim 1, wherein:
   the two wire power supply loop complies to an industry standard, in particular Foundation Fieldbus, Profibus, Modbus, HART or Ethernet.

4. A method of operation low power ultrasonic flowmeter including an ultrasonic flow sensor, a signal processing unit for determining a measurement result based on the ultrasonic flow sensor, an input/output unit to be connected to the wire loop for controlling a current of the power supplied to represent the measurement result and for receiving power from the power supply loop, and a power management system for an energy efficient distribution of the power supplied to the flowmeter via the input/output unit, the power management system comprising storage means for storing energy during times of low power consumption and resupplying the stored energy during times of high power consumption, and further storage means for storing incoming energy received via the input/output unit, wherein a measurement cycle comprises the steps of:
   storing energy during times of low power consumption and resupplying the stored energy during times of high power consumption;
   initiation of at least one ultrasonic signal;
   reception of a corresponding ultrasonic measurement signal;
   processing of the measurement signal to provide a measurement result; and
   providing an output according to the measurement result, wherein:
   power for initiation of ultrasonic signal is provided by the power management system utilizing instantaneous incoming power and power stored in the storage means.

5. The method of operation of a low power ultrasonic flowmeter according to claim 4, wherein:
   during the steps of reception of a corresponding ultrasonic measurement signal, processing of the measurement signal to provide a measurement result and providing an output according to the measurement result, surplus energy is stored in the storage means.

6. The method of operation of a low power ultrasonic flowmeter according to claim 4, wherein:
   the flowmeter has energy consuming components; and
   said energy consuming components are only active when they perform and they are in a low power standby or inactive mode during all other times of every measurement cycle.

* * * * *